Patented Jan. 6, 1953

2,624,729

UNITED STATES PATENT OFFICE 2,624,729

HETEROCYCLIC COMPOUNDS CONTAINING SULFUR AND NITROGEN IN THE RING

Sidney Melamed, Philadelphia, and Willard J. Croxall, Bryn Athyn, Pa., assignors to Rohm & Haas Company, Philadelphia, Pa., a corporation of Delaware No Drawing. Application December 1, 1950, Serial No. 198,724

6 Claims. (Cl. 260—243)

This invention relates to compounds of the structure

wherein A is in its preferred form an alkylene chain of two to three carbon atoms, R is an alkyl, aralkyl, or cycloalkyl group, and X is a sulfur linkage which together with the nitrogen atoms and the alkylene group forms a heterocycle. The group represented by X may take the form of —S$_x$— including —S—, —SO—, or —SO$_2$—, where $x$ is a small integer.

The compounds which are defined by the above structural formula are prepared by reacting together an alkylenediamine of the formula RNH—A—NHR, where A is a 1,2- or a 1,3-alkylene group, with a sulfur chloride including sulfur dichloride, thionyl chloride, or sulfuryl chloride or the comparable sulfur bromides. The reaction is best effected in the presence of an inert organic solvent, such as naphtha, benzene, toluene, petroleum ether, ethyl ether, isopropyl ether, or the like. The reaction is carried out in general below 50° C. and is preferably undertaken at a temperature between 0° and 30° C.

The reaction proper involves one mole of the N,N'-disubstituted alkylenediamine and one mole of the sulfur acid halide. Yet since hydrogen halide is split out, it is necessary to have an acceptor present therefor. This is most effectively done by using an excess of the diamine. Hence, in the practical accomplishment of the reaction two moles of diamine are used per mole of sulfur acid halide. In some cases, however, where the product is not sensitive to strong alkalies, other alkaline agents may be used in place of excess of diamine. This is a procedure which may in particular be successfully used when sulfuryl chloride is one of the reactants, in which case a strong alkali, such as sodium hydroxide or potassium hydroxide, may be used as acceptor for the hydrogen halide. There may similarly be used a strongly basic tertiary amine as an acceptor, such as pyridine.

The N,N'-disubstituted diamines are 1,2- or 1,3-alkylenediamines which have as the N,N'-substituents alkyl, aralkyl, or cycloalkyl groups. In particular the N,N'-disubstituted 1,2-ethylenediamines and the N,N'-disubstituted 1,2- or 1,3-propylenediamines are of interest, although other alkylenediamines such as 2,3-butylene- or 1,3-hexylene-, or the like diamines may also be used. The size of the nitrogen substituents may vary from the methyl group to octadecyl groups or dodecylbenzyl groups or the like, a practical upper limit for the N- groups being 18 or 19 carbon atoms. Typical alkyl groups include methyl, ethyl, propyl, butyl, hexyl, octyl, nonyl, decyl, dodecyl, hexadecyl, and octadecyl groups and other alkyl groups in their various isomeric forms. As typical of the aralkyl groups there may be mentioned benzyl, methylbenzyl, butylbenzyl, octylbenzyl, nonylbenzyl, dodecylbenzyl, tetradecylbenzyl, and the like, while the cycloalkyl groups include cyclopentyl, cyclohexyl, methylcyclohexyl, butylcyclohexyl, etc.

Further details of the preparation of typical compounds of this invention are given in the following illustrative examples. Parts given are by weight unless otherwise designated.

Example 1

A solution of 68 parts of sulfuryl chloride in 75 parts of petroleum ether was added slowly to 88 parts of N,N'-dimethylethylenediamine in 300 parts of petroleum ether at 0°–5° C. The reaction was stirred for five hours and the solvent was decanted off. The residual solid was extracted with several portions of hot ether. The combined extracts were concentrated, and the residual syrup was allowed to crystallize. Recrystallization from a mixture of benzene and naphtha gave 25 parts of a hygroscopic, white solid, which corresponded in composition to 2,5-dimethyl-1,2,5-thiadiazolidine-1,1-dioxide. This product contained by analysis 18.67% of nitrogen and 21.33% of sulfur. Corresponding theoretical values are 18.72% and 21.03% respectively.

This compound has the structural formula

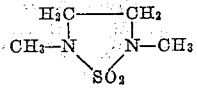

Example 2

A cooled solution of 112 parts of N,N'-dicyclohexylethylenediamine in 400 parts of naphtha was treated slowly with stirring with 34 parts of sulfuryl chloride. The mixture was stirred at room temperature for three hours and filtered. Concentration of the filtrate gave 7 parts of solid product. An additional 21 parts was isolated by extracting the original precipitate with two portions of ether and evaporating the ether. This represents a combined yield of 40%. The product when recrystallized from ethanol has a melting point of 94°–96° C. It corresponds in composition to 2,5-dicyclohexyl-1,2,5-thiadiazolidine-1,1-dioxide, containing 9.45% of nitrogen and 10.53% of sulfur (theory 9.80% and 11.2% respectively) This compound has the structural formula

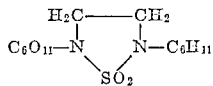

where $C_6H_{11}$ represents the cyclohexyl group. The cyclic sulfur amides of the above type, i. e. thiadiazolidinedioxides, and likewise the thiadiazinedioxides, illustrated in Example 6, have marked solvent action. They are thus of interest as plasticizers, softeners, and modifiers for resins.

*Example 3*

A solution of 112 parts of N,N'-dicyclohexylethylenediamine in 240 parts of naphtha was treated dropwise while the mixture was cooled and stirred with 34 parts of sulfur monochloride. The reaction mixture was stirred for five hours at room temperature and then filtered. Concentration of the filtrate gave 21 parts of very sticky oil as product, which corresponded in composition to 3,6-dicyclohexyl-tetrahydro-1,2,3,6-dithiadiazine. The product contained by analysis 9.5% of nitrogen and 21.3% of sulfur (theory 9.78% and 22.38% respectively).

*Example 4*

A solution of 149 parts of N,N'-di-(2-ethylhexyl)trimethylenediamine in 400 parts of naphtha was cooled to 3° C. and treated while it was stirred and cooled with 26 parts of sulfur dichloride at 3°–10° C. over a half hour period. The mixture was stirred at room temperature for one and one-half hours, diluted with 750 parts of naphtha and filtered. The solid filtered off was washed with two portions of naphtha, each of about 750 parts, and dried to give 101 parts. The theoretical yield of diamine dihydrochloride is 93 parts. The combined filtrates were concentrated and the product was isolated as a viscous residue of 65 parts, an 80% yield of 2,6-di-(2-ethylhexyl)perhydro-1,2,6-thiadiazine. This product contained by analysis 8.1% of nitrogen and 10.8% of sulfur (theory 8.53% and 9.76% respectively).

This compound may be represented by the formula

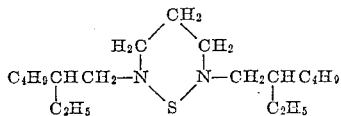

*Example 5*

A solution of 119 parts of N,N'-di-2-(ethylhexyl)trimethylenediamine in 750 parts of naphtha was cooled in an ice bath and treated with 24 parts of thionyl chloride. The mixture was stirred for an additional five hours at room temperature and filtered. The solid was washed with naphtha and dried to give 68 parts (91%) of the theoretical amine dihydrochloride. The filtrate was concentrated in vacuo and the product isolated as a viscous concentrate in 73% yield (50 parts). It was 2,6-di-(2-ethylhexyl)perhydro-1,2,6-thiadiazine-1-oxide, which contained by analysis 7.9% of nitrogen and 8.1% of sulfur (theory 8.14% and 9.3% respectively).

The formula for this compound is

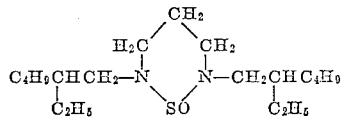

*Example 6*

Sulfuryl chloride, 27 parts, was added dropwise to a naphtha solution of 119 parts of N,N'-di-(2-ethylhexyl)trimethylenediamine at 4°–10° C. in 15 minutes. The mixture was warmed to 25° C. and stirred for an additional five hours and filtered. The precipitate was washed with naphtha and dried to give 60 parts or 81% of the theoretical dihydrochloride. The filtrate was washed with a mixture of ethanol and dilute aqueous hydrochloric acid and then with 60% aqueous ethanol until neutral. Removal of the solvent and concentration in vacuo allowed the isolation of the product as a concentrate, 40 parts being thus obtained of 2,6-di-(2-ethylhexyl)perhydro-1,2,6-thiadiazine-1,1-dioxide. It contained by analysis 7.4% of nitrogen and 8.7% of sulfur (theory 7.8% and 8.9% respectively).

*Example 7*

Sulfur dichloride, 15.4 parts, was added to a solution of 94 parts of N,N'-di-(3,5,5-trimethylhexyl)ethylenediamine in 100 parts of dry ether at 5°–10° C. When the addition was complete, the mixture was stirred for three hours, diluted with 240 parts of benzene and filtered. Concentration of the filtrate gave 39 parts of 2,5-di-(3,5,5-trimethylhexyl)-1,2,5-thiadiazolidine as a viscous, red oil. It contained by analysis 7.7% of nitrogen and 8.8% of sulfur (theory 8.19 and 9.36% respectively).

This compound has the structure

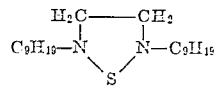

where the $C_9H_{19}$ group is 3,5,5-trimethylhexyl.

*Example 8*

Sulfur monochloride, 45 parts, was added slowly to a solution of 210 parts of N,N'-di-(3,5,5-trimethylhexyl)ethylenediamine in 250 parts of naphtha at 5°–10° C. The mixture was stirred for an additional three hours at 25° C. and then treated with 30 parts of a filter aid and filtered. The filtrate was stripped in vacuo and the product was isolated as a viscous red oil in an amount of 68 parts in a 55% yield. An additional 16 parts was obtained by re-extracting the solid precipitate, thus increasing the yield to 68% of 3,6-di-(3,5,5 - trimethylhexyl)tetrahydro - 1,2,3,6 - dithiadiazine. This contained by analysis 7.0% of nitrogen and 17.3% of sulfur (theory 7.47% and 17.1% respectively).

A probable structure for this compound is

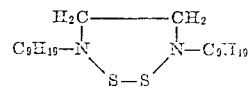

where $C_9H_{19}$ represents the 3,5,5-trimethylhexyl group.

*Example 9*

A solution of 210 parts of N,N'-di-(3,5,5-trimethylhexyl)ethylenediamine in 350 parts of petroleum ether was treated at 5° C. with 39.7 parts of thionyl chloride. When the addition was complete, the cooling bath was removed and the mixture was stirred continuously and allowed to become warm from the heat of reaction. The mixture thickened considerably, a solid formed, and the mix was allowed to stand for 12 hours. Filter-aid was added and the solid removed by filtration. Concentration of the filtrate gave 86 parts, 72%, of viscous, orange oil as product. This corresponded in composition to 2,5-di-(3,5,5-trimethylhexyl)-1,2,5-thiadiazolidine-1-oxide. It yielded the following analytical data: nitrogen 7.5% and sulfur 8.2% (theory 7.8% and 8.92% respectively).

*Example 10*

A well-stirred mixture of 38 parts of N,N'-dinonylethylenediamine, 20 parts of powdered potassium hydroxide, and 140 parts of anhydrous ether was cooled in an ice bath and treated dropwise with 16.2 parts of sulfuryl chloride. The mixture was stirred for three hours, diluted with benzene, and poured into ice water with stirring. The organic layer was separated and washed with ice water, with dilute hydrochloric acid in ethanol, and with aqueous ethanol until it was neutral. The organic layer was concentrated in vacuo to yield as a viscous oil 2,5-di-(3,5,5-trimethylhexyl) - 1,2,5 - thiadiazolidine-1,1-dioxide. This contained by analysis 7.3% of nitrogen and 7.9% of sulfur (theory 7.49% and 8.56% respectively).

*Example 11*

A solution of 111 parts of N-N'-didodecylethylenediamine in 250 parts of ether was treated dropwise with sulfur dichloride, 14 parts, while the reaction mixture was stirred and cooled. The mixture was then stirred for eight hours and filtered. The filtrate was concentrated to give 43 parts of a dark, semi-solid product, 2,5-didodecyl-1,2,5-thiadiazolidine. This contained by analysis 6.2% of nitrogen and 7.6% of sulfur (theory 6.58% and 7.52% respectively).

*Example 12*

A solution of 56.4 parts of N,N'-dioctadecylethylenediamine in 500 parts of naphtha was treated with 13.5 parts of sulfuryl chloride and stirred for five hours. There was then added 16 parts of a 50% sodium hydroxide solution and stirring was continued for an hour. Layers were allowed to form and were separated. The oil layer was treated with water and layers again were formed and separated. The solvent was evaporated and the residue was stripped by being heated to 150° C./1 mm. The residue corresponded in composition to 2,5-dioctadecyl-perhydro-1,2,5-thiadazine-1,1-dioxide.

*Example 13*

A solution of 51 parts of N,N'-dibenzyl-1,2-propylenediamine in 400 parts of toluene was cooled to 5° C. and treated with 12 parts of thionyl chloride. The mixture was stirred for four hours at room temperature and then filtered. The solid was rinsed with petroleum ether and combined with the filtrate, which was then concentrated under reduced pressure. A brown oil was obtained which corresponded in composition to 2,5-dibenzyl-3-methyl-1,2,5-thiadiazolidine-1-oxide, containing 9.2% of nitrogen and 10.5% of sulfur (9.3% and 10.7% being the respective theoretical values). This compound has the structure

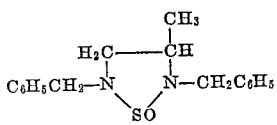

The compounds of this invention have pesticidal properties and, hence, find use in insecticidal and fungicidal compositions in which they may be diluted with liquid or with finely divided solid. Some typical test data follow.

A spray containing 2,6-di(2-ethylhexyl)perhydro-1,2,6-thiadiazine at a dilution of 1:400 was applied to plants infested with aphids and with red spiders. A control of 97% was obtained against the former and of 98% against the latter. In standard fungitoxicity tests there was a 100% inhibition of germination of spores of *Sclerotinia fructicola* and *Macrosporium sarcinaeforme* at 0.0005% and at 0.01% respectively. In tests to determine the tenacity of the compound under a water spray values of over 16 minutes were obtained, the tenacity value being the time which a cellulose nitrate coated plate dried with test compound can be water washed without permitting germination of spores to ensue.

In tests with 2,6-di(2-ethylhexyl)perhydro-1,2,6-thiadiazine-1-oxide there was 100% inhibition of germination of spores of both of the above two organisms at a dilution of 0.0005%. At a dilution of 1:400 there was obtained a 100% control of both aphids and red spider.

With 2,5-di(3,5,5-trimethylhexyl)-1,2,5-thiadiazolidine there was obtained 100% inhibition of germination of spores of *Macrosporium sarcinaeforme* at 0.01% and of *Sclerotinia fructicola* at 0.005%.

In the case of N,N'-di(3,5,5-trimethylhexyl)-perhydrodithiadiazine there was observed complete inhibition of germination of spores of both the above fungi at 0.005%. The same dilution gave complete inhibition of germination of spores of *Sclerotinia fructicola* with 2,5-di(3,5,5-trimethylhexyl) 1,2,5-thiadiazolidine-1-oxide.

We claim:

1. As new chemical substances, compounds of the formula

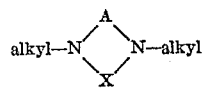

wherein A is an alkylene chain of two to three carbon atoms, X is a sulfur linkage selected from the class consisting of —S$_x$—, —SO—, and —SO$_2$— groups wherein $x$ is an integer having a value of one to two, and the designated alkyl groups contain not over 18 carbon atoms each.

2. As a new chemical substance, a compound of the formula

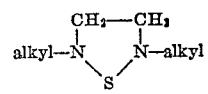

wherein the alkyl groups contain not over 18 carbon atoms each.

3. As a new chemical substance, a compound of the formula

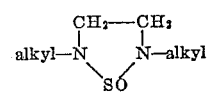

wherein the alkyl groups contain not over 18 carbon atoms each.

4. As a new chemical substance, a compound of the formula

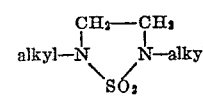

wherein the alkyl groups contain not over 18 carbon atoms each.

5. As a new chemical substance, a compound of the formula

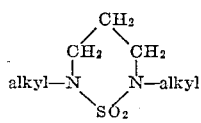

wherein the alkyl groups contain not over 18 carbon atoms each.

6. As a new chemical substance, a compound of the formula

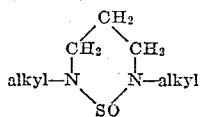

wherein the alkyl groups contain not over 18 carbon atoms each.

SIDNEY MELAMED.
WILLARD J. CROXALL.

REFERENCES CITED

The following references are of record in the file of this patent:

UNITED STATES PATENTS

| Number | Name | Date |
|---|---|---|
| 2,292,456 | Lincoln et al. | Aug. 11, 1942 |
| 2,454,262 | Walter | Nov. 16, 1948 |
| 2,459,114 | Oberright | Jan. 11, 1949 |
| 2,473,042 | Walter | June 14, 1949 |

FOREIGN PATENTS

| Number | Country | Date |
|---|---|---|
| 49,191 | Germany | Oct. 4, 1899 |